US007227721B1

(12) United States Patent
Kientz et al.

(10) Patent No.: US 7,227,721 B1
(45) Date of Patent: Jun. 5, 2007

(54) MULTI-DIRECTIONAL CARTRIDGE MEMORY ANTENNA DESIGNS

(75) Inventors: Steven Michael Kientz, Westminster, CO (US); Michael S. Wagner, Longmont, CO (US); Matthew P. Wojciechowski, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 468 days.

(21) Appl. No.: 10/717,318

(22) Filed: Nov. 19, 2003

(51) Int. Cl.
*G11B 23/107* (2006.01)
(52) U.S. Cl. .................................... 360/132
(58) Field of Classification Search ................. 360/132
See application file for complete search history.

(56) References Cited

U.S. PATENT DOCUMENTS

| 6,081,857 | A | 6/2000 | Frary | 710/74 |
| 6,226,688 | B1 | 5/2001 | Frary | 709/310 |
| 6,304,416 | B1 | 10/2001 | McAllister et al. | 360/132 |
| 6,466,990 | B2 | 10/2002 | Frary | 709/310 |
| 6,702,215 | B2 * | 3/2004 | Stamm et al. | 242/348 |
| 6,865,047 | B2 * | 3/2005 | Maekawa et al. | 360/69 |
| 6,967,630 | B2 * | 11/2005 | Tada | 343/867 |
| 7,077,489 | B2 * | 7/2006 | Waters | 347/2 |
| 2001/0011012 | A1 * | 8/2001 | Hino et al. | 455/90 |
| 2003/0089809 | A1 * | 5/2003 | Maekawa et al. | 242/332.4 |
| 2004/0004145 | A1 * | 1/2004 | Stamm et al. | 242/348 |
| 2004/0004789 | A1 * | 1/2004 | Watanabe et al. | 360/132 |
| 2004/0042122 | A1 * | 3/2004 | Honda | 360/132 |

OTHER PUBLICATIONS

U.S. Appl. No. 10/199,791, Frary, System and Method for Data Storage Management, filed Jul. 19, 2002.

* cited by examiner

*Primary Examiner*—Jefferson Evans
(74) *Attorney, Agent, or Firm*—Brooks Kushman P.C.

(57) ABSTRACT

A method and system for transmitting tape cartridge information using a bi-axial tape cartridge antenna design. A contactless tape cartridge memory device is provided in which the memory device is accessible from multiple surfaces of the cartridge. A single flexible antenna surrounds the tape cartridge memory device. The antenna may be bent to fit within the corner of the tape cartridge, thus providing a parallel antenna surface to two locations on the cartridge, such as the front of the cartridge and the side or bottom of the cartridge. As a result, the memory device in the tape cartridge may be read when the cartridge is being inserted into the tape drive as well as while the cartridge is stored within the tape drive.

29 Claims, 3 Drawing Sheets

MULTI-DIRECTIONAL CARTRIDGE MEMORY ANTENNA DESIGNS

BACKGROUND OF THE INVENTION

1. Field of the Invention

The present invention relates generally to an improved contactless tape cartridge memory device. In particular, the present invention relates to a method and system for using an RFID memory device having a bi-axial reader antenna design in a tape cartridge to communicate with a tape drive.

2. Background of the Invention

Radio frequency identification (RFID) systems provide a wireless means of communication between tagged objects and readers. RFID offers the means to identify, locate, and track objects using a radio frequency (RF) transmission. An RFID tag offers benefits over using a barcode, for the RFID tags can be read at greater distances, in any orientation, and through intervening objects, as well as offering the means to update and store information on the tag itself.

A typical RFID system includes a reader, a tag or transponder, and a data processing system. In a passive RFID system, the RFID tag does not have a power source. Instead, the reader is used to activate the passive tag by emitting a radio frequency (RF) signal via an antenna connected to the reader. The reader antenna may be of various size and structure, depending upon the communication distance required for the particular system. When the tag is in range of the reader antenna's magnetic field, the reader antenna transmits energy to the tag, which returns its on-chip data to the reader via a backscattering modulation.

The tag is typically mounted onto a moveable object. The tag includes an integrated circuit (IC) and an antenna assembly. The antenna captures and transmits signals to and from the reader.

RFID systems may be used for various applications, including identifying tape cartridge information. Tape cartridges have proven to be an efficient and effective medium for data storage, including backing up data from primary storage devices and acting as primary storage devices for infrequently accessed data. In a conventional tape library employing an RFID system, the reader is located within the tape drive. As the tape cartridge is inserted into the tape drive, the reader supplies power to the memory device within the tape cartridge and may receive data stored within the cartridge memory device.

However, it would be beneficial to be able to access the RFID memory device in the tape cartridge while the tape cartridge is inserted into the tape drive. Consequently, it would be advantageous to have a contactless tape cartridge memory device which is accessible from multiple surfaces of the cartridge. In particular, it would be advantageous to have a contactless tape cartridge memory device accessible from the front of the cartridge by a hand held reader and from the side or the bottom of a cartridge by the tape drive.

SUMMARY OF THE INVENTION

The present invention provides a method and system for transmitting tape cartridge information using a bi-axial tape cartridge antenna design. A contactless tape cartridge memory device is provided in which the memory device is accessible from multiple surfaces of the cartridge. For example, a hand held reader may access the memory device from the front of the cartridge while the tape drive can access the memory device from the side or the bottom of the cartridge. As a result, the memory device in the tape cartridge may be read when the cartridge is being inserted into the tape drive as well as while the cartridge is stored within the tape drive.

In the preferred embodiment, the present invention includes a memory device surrounded by a single flexible antenna. The flexible antenna may be bent to fit in the corner of the tape cartridge, so that the tape cartridge memory device is accessible from at least two surfaces of the cartridge.

An alternative embodiment of the present invention includes attaching two separate antennas to the tape cartridge memory device. Each antenna would be orthogonal to the other, thus providing a parallel antenna surface to two locations on tape cartridge.

A further alternative embodiment of the present invention includes imbedding the antenna into the cartridge molding, making the antenna and the cartridge the same component. Since the antenna is imbedded within the cartridge, concerns regarding the placement of the component or whether the antenna component might get loose within the cartridge, thereby making the antenna unusable for its desired purpose, would no longer be relevant. In addition, communication distance may be optimized using an imbedded antenna since the distance between the tag antenna and the reader antenna would be diminished.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and system for transmitting tape cartridge information using a bi-axial tape cartridge antenna design. The present invention may be implemented in any tape library system. A contactless tape cartridge memory device is provided in which the memory device is accessible from multiple surfaces of the cartridge. In the preferred embodiment, the present invention includes a tape cartridge memory device surrounded by a single flexible antenna. The antenna may be bent to fit within the corner of the tape cartridge, thus providing a parallel antenna surface to two locations on the cartridge, such as the front of the cartridge and the side or bottom of the cartridge.

Figure 1:
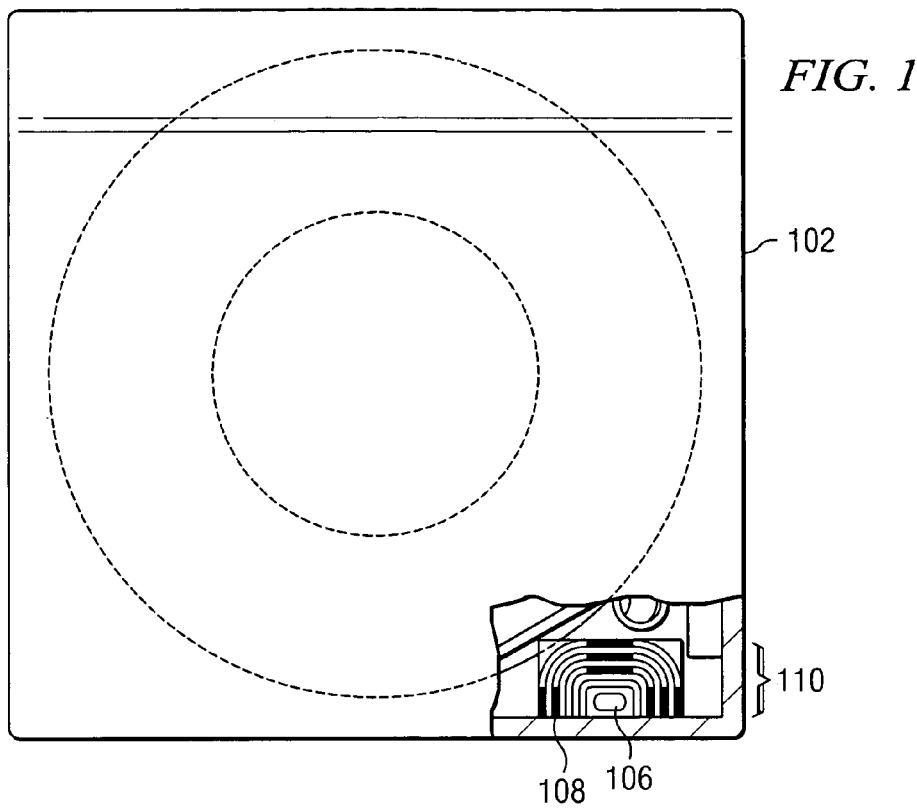
FIG. 1 depicts a top perspective view of a tape cartridge in accordance with a preferred embodiment of the present invention.

FIG. 1 shows a tape cartridge in accordance with a preferred embodiment of the present invention. In this embodiment, the tape cartridge memory device/antenna is curved to fit within the corner of the tape cartridge. Tape cartridge 102 includes a memory device 106 connected to and surrounded by antenna 108. Memory device 106 and antenna 108 are connected to form an RFID tag 110. Memory device 106 may be a conventional integrated circuit, or any other memory storage device capable of receiving electronic information. Memory device 106 contains information related to tape cartridge 102, including cartridge identification information, performance and manufacturing data, and file location information.

Figure 2:
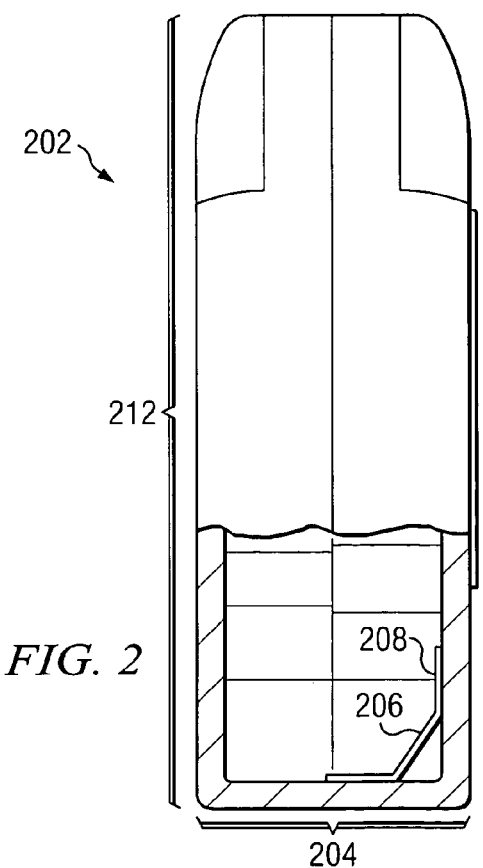
FIG. 2 depicts a side perspective view of a tape cartridge in accordance with a preferred embodiment of the present invention.

Antenna 108 is preferably a helical antenna surrounding memory device 106. Antenna 108 captures and transmits signals to and from a reader. As shown in FIGS. 1 and 2, antenna 108, 208 may be bent in a manner so as to position RFID tag 110 to fit within a corner of tape cartridge 102. Although RFID tag 110 is set in a corner in the front of tape cartridge 102, RFID tag 110 may be located in any corner of tape cartridge 102, depending upon the desired location of access. Flexible antenna 108 provides a parallel antenna surface to two locations on the cartridge. For example, in FIG. 2, memory device 206 may be accessible from front 204 of cartridge by a hand held reader, as well as from side or bottom 212 of cartridge 202 by the tape drive.

Figure 3A:
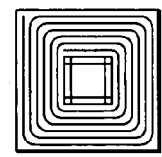
FIGS. 3A–3C are examples of a tape cartridge memory device in accordance with a preferred embodiment of the present invention.
Figure 3B:
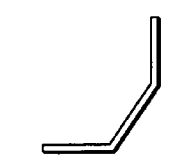
Figure 3C:

An example of an RFID tag having a flexible antenna connected to and surrounding a memory device is shown in FIGS. 3A–C, with illustrations of the RFID tag shown via top view 3A, side view 3B, and front view 3C.

Figure 4:
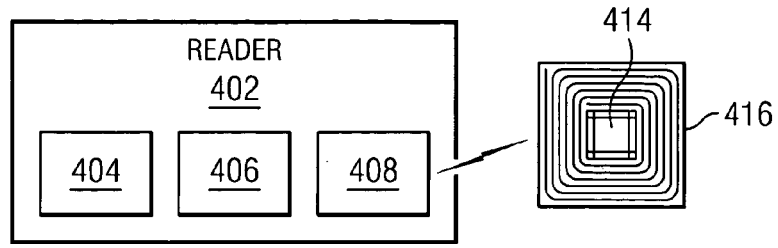
FIG. 4 depicts a tape cartridge and reader system in accordance with a preferred embodiment of the present invention.

Turning now to FIG. 4, a tape cartridge and reader system in accordance with a preferred embodiment of the present invention is shown. Reader 402 is used to activate the passive tag via a radio frequency (RF) signal. Reader 402 includes an IC chip 404, oscillator 406 for generating and amplifying signals, and a reader antenna 408. Power is provided to reader IC chip 404 and to oscillator 406.

An RF signal may be continuously transmitted from reader antenna 408 located in, for example, a tape drive or a hand held device. When memory device 414 is in range of the reader's magnetic field, the RF field passes through antenna coil 416. Consequently, inductive coupling occurs between reader 402 and cartridge memory device 414, whereby cartridge memory device 414 effectively downloads the reader signal. The transmitted energy is used to power memory device 414. Once the signal is loaded down, reader IC chip 404 detects the presence of memory device 414 as a decrease in amplitude.

Figure 5:
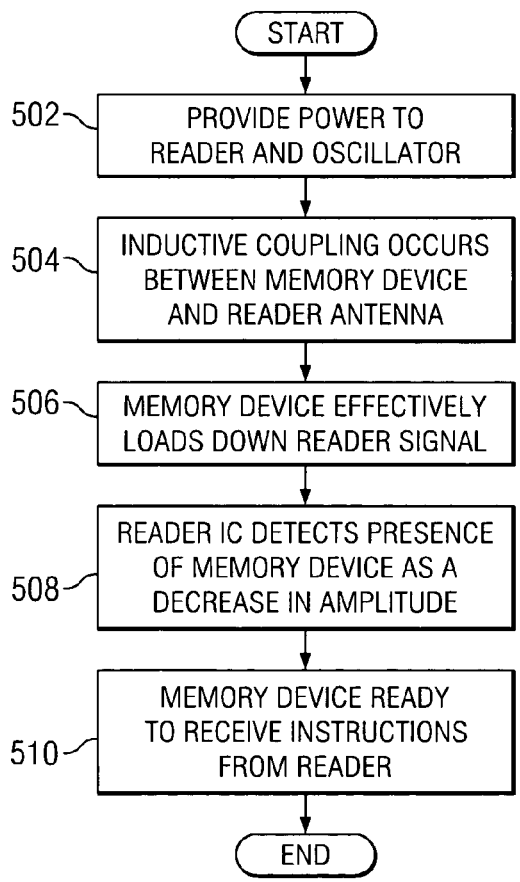
FIG. 5 is a flowchart depicting a contactless data transmission process in accordance with a preferred embodiment of the present invention.

FIG. 5 is a flowchart depicting a contactless data transmission process in accordance with a preferred embodiment of the present invention. The process begins with the tape drive providing power to the reader device and to the oscillator (step 502). When the passive cartridge device is in close proximity to the energized reader antenna, inductive coupling occurs (step 504). In response, the passive cartridge device effectively loads down the reader signal (step 506). Once the signal is loaded down the reader IC detects the presence of the passive cartridge device as a decrease in amplitude (step 508). At this point the device is ready to receive instructions from the reader (step 510).

As stated before, the present invention provides a mechanism for transmitting tape cartridge information using a bi-axial tape cartridge antenna design. FIGS. 1–3 illustrate an antenna design comprising a single data transmitted antenna.

Figure 6A:
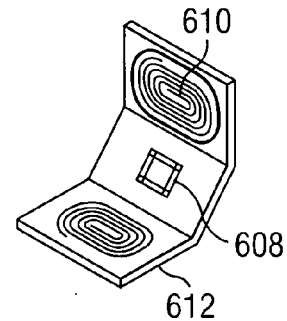
FIGS. 6A–6C are examples of a tape cartridge memory device in accordance with an alternative embodiment of the present invention.
Figure 6B:
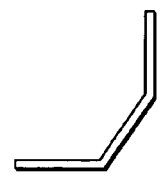
Figure 6C:
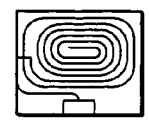

FIGS. 6A–C shows an alternative embodiment of antenna 108, with illustrations of the RFID tag shown via top view 6A, side view 6B, and front view 6C. Top view 602 of the RFID tag depicts memory device 608 connected to two antennas 610 and 612. Second antenna 612 is added to the RFID tag at a right angle to first antenna 610. Antennas 610 and 612 may be flexible, similar to antenna 108 in FIG. 1, or rigid antennas may be used. In either case, positioning second antenna 612 at a right angle to first antenna 610 provides a parallel antenna surface to two locations on tape cartridge.

Figure 7:
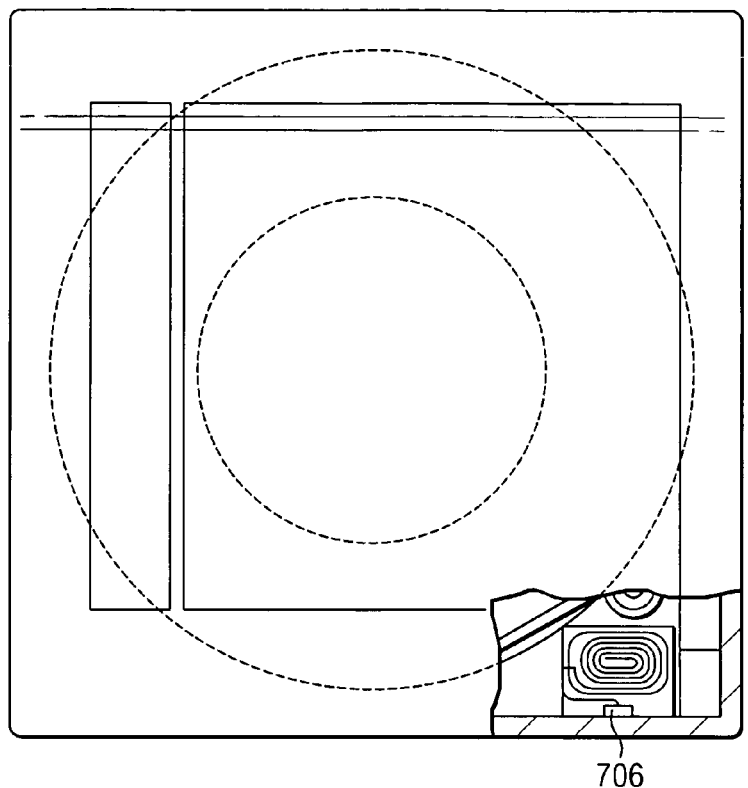
FIG. 7 depicts a top perspective view of a tape cartridge in accordance with an alternative embodiment of the present invention.
Figure 8:
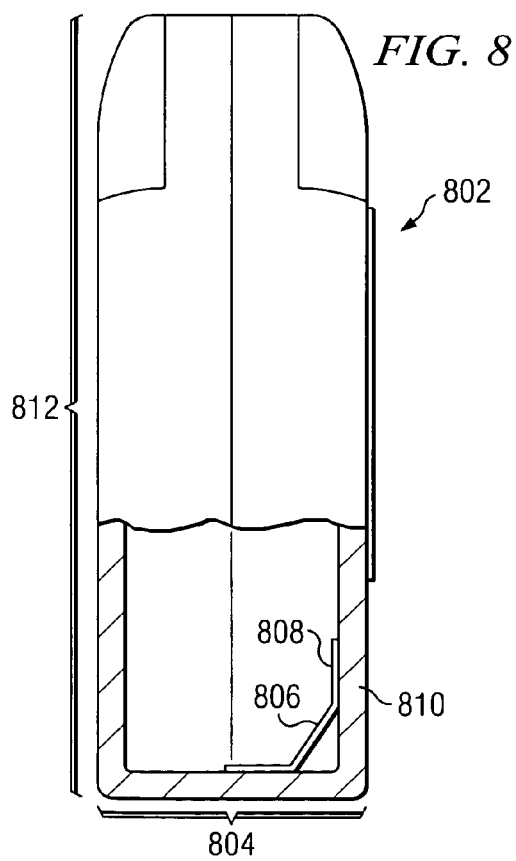
FIG. 8 depicts a side perspective view of a tape cartridge in accordance with an alternative embodiment of the present invention.

FIGS. 7 and 8 illustrate, respectively, a top and side perspective view of a tape cartridge in accordance with the embodiment of the present invention as described in FIGS. 6A–C. Memory device 706, 806 may be accessible from front 804 of cartridge 802 by a hand held reader, as well as from side or bottom 812 of cartridge 802 by a tape drive. Antennas 808 and 810 are connected to memory device 806 and positioned within a corner of tape cartridge 802.

Figure 9:
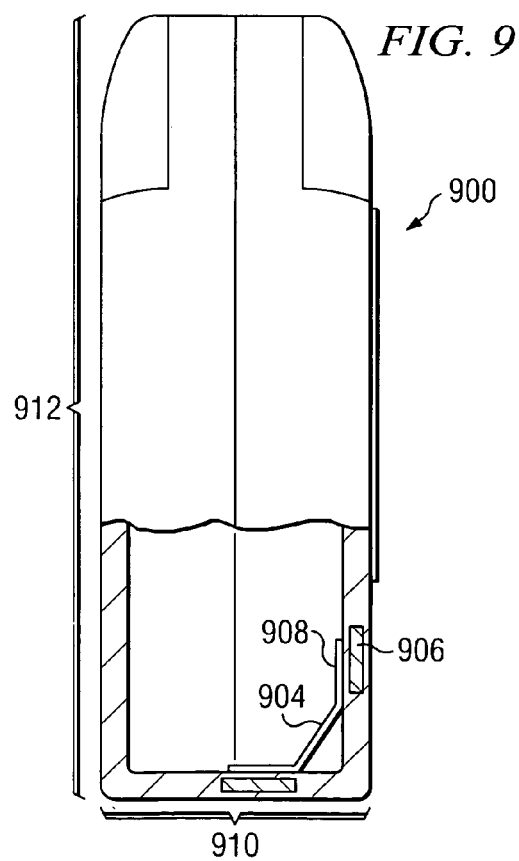
FIG. 9 depicts a diagram of a tape cartridge with an imbedded antenna in accordance with an alternative embodiment of the present invention.

Turning now to FIG. 9, a third embodiment of the present invention is shown. FIG. 9 depicts a memory device connected to an antenna which is imbedded into the tape cartridge molding. Imbedded RFID tag comprises a memory device 904 and an imbedded antenna 906 that is molded into two surfaces of tape cartridge 900. Memory device 904 may be set up or soldered against an inside surface of cartridge 900. Memory device 904 may also be connected to imbedded antenna 906. For example, imbedded antenna 906 may contain a connection point 908 for memory device 904. Memory device 904 may then be connected to imbedded antenna 906, for example, via an exposed wire coming out of imbedded antenna 906.

The positioning of imbedded antenna 906 may be similar to the positioning of flexible antenna 108 as described in FIG. 1. In other words, imbedded antenna 906 may be positioned to provide a parallel antenna surface to two locations on cartridge 900. For example, memory device 904 may be accessible from front 910 of cartridge by a hand held reader, as well as from side or bottom 912 of cartridge 900 by the tape drive. In the preferred embodiment, imbedded antenna 906 is a coil antenna, although other antenna configurations may be implemented.

Imbedding the antenna into the cartridge molding maximizes efficiency of the antenna to reader transmission. Communication distance between the antenna and the reader is optimized, since the tag antenna and reader antenna can make closer contact. In addition, the antenna component of the RFID tag would no longer be a separate component from cartridge. Furthermore, placement of the antenna component would no longer be an issue, since the antenna would be imbedded in the cartridge. In other words, the antenna placement decision is performed during cartridge manufacturing, rather than when the memory device is set into the cartridge.

Thus, the present invention provides a method and system for transmitting tape cartridge information using a bi-axial tape cartridge antenna design. A contactless tape cartridge memory device is provided in which the memory device is accessible from multiple surfaces of the cartridge. For example, a hand held reader may access the memory device from the front of the cartridge while the tape drive can access the memory device from the side or the bottom of the cartridge. As a result, the memory device in the tape cartridge may be read when the cartridge is being inserted into the tape drive as well as while the cartridge is stored within the tape drive.

The advantages of the present invention should be apparent in view of the detailed description above. The present invention offers a bi-axial tape cartridge antenna design which provides a parallel antenna surface to at least two locations on tape cartridge.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape cartridge that is operable with a reader device, comprising:
    a tape;
    a contactless memory device positioned in a corner of the tape cartridge; and
    a flexible antenna connected to and encircling the memory device;
    wherein the flexible antenna receives radio frequency signals from a transmitting antenna located on the reader device;
    the reader device detecting a decrease in amplitude at the transmitting antenna that indicates the presence of the memory device; and
    wherein the flexible antenna is bent around the corner of the tape cartridge so that signals may be received by the flexible antenna through at least two surfaces of the tape cartridge.

2. The tape cartridge of claim 1, wherein the radio frequency signals from the transmitting antenna energize the flexible antenna via inductive coupling.

3. The tape cartridge of claim 2, further comprising:
    wherein the energized flexible antenna returns a radio frequency signal containing tape cartridge data stored within the memory device to the transmitting antenna.

4. The tape cartridge of claim 3, wherein the signal containing memory device data is returned via a backscattering modulation.

5. The tape cartridge of claim 1, wherein the transmitting antenna is connected to a tape drive.

6. The tape cartridge of claim 1, wherein the transmitting antenna is connected to a hand held reader.

7. The tape cartridge of claim 1, wherein the flexible antenna is a helical antenna.

8. A tape cartridge that is operable with a reader device, comprising:
    a tape;
    a contactless memory device positioned in a corner of the tape cartridge; and
    at least two antennas connected to the memory device, wherein the at least two antennas receive radio frequency signals from a transmitting antenna being attached to the reader device;
    the reader device detecting a decrease in amplitude at the transmitting antenna that indicates the presence of the memory device, and
    wherein the at least two antennas are positioned orthogonal to each other in the corner of the tape cartridge so that the signals may be received by the at least two antennas through at least two surfaces of the tape cartridge.

9. The tape cartridge of claim 8, wherein the radio frequency signals from the transmitting antenna energize the at least two antennas via inductive coupling.

10. The tape cartridge of claim 9, further comprising:
    wherein the energized antennas return a radio frequency signal containing tape cartridge data stored within the memory device to the transmitting antenna.

11. The tape cartridge of claim 10, wherein the signal containing memory device data is returned via a backscattering modulation.

12. The tape cartridge of claim 8, wherein the transmitting antenna is connected to a tape drive.

13. The tape cartridge of claim 8, wherein the transmitting antenna is connected to a hand held reader.

14. The tape cartridge of claim 8, wherein the at least two antennas are helical antennas.

15. A method of transmitting data from a tape cartridge using radio frequency signals, comprising:
    positioning a memory device in a corner of the tape cartridge, wherein the memory device is connected to and encircled by a flexible antenna;
    receiving a radio frequency signal sent from a transmitting antenna at the flexible antenna, wherein the flexible antenna is bent around the corner of the tape cartridge so that signals may be received by the flexible antenna through at least two surfaces of the tape cartridge;
    detecting a decrease in amplitude at the transmitting antenna indicating the presence of the memory device;
    transmitting tape cartridge data stored in the memory device to the transmitting antenna.

16. A tape cartridge, comprising:
    a tape;
    a contactless memory device positioned in a corner of the tape cartridge; and
    an antenna imbedded into the frame of the tape cartridge, wherein the imbedded antenna is connected to the memory device;
    wherein the imbedded antenna receives radio frequency signals from a transmitting antenna, and
    wherein the imbedded antenna is molded into the frame of the tape cartridge in such a manner that signals may be received by the imbedded antenna through at least two surfaces of the tape cartridge.

17. The tape cartridge of claim 16, wherein the radio frequency signals from the transmitting antenna energize the imbedded antenna via inductive coupling.

18. The tape cartridge of claim 16, further comprising:
    wherein the energized imbedded antenna returns a radio frequency signal containing tape cartridge data stored within the memory device to the transmitting antenna.

19. The tape cartridge of claim 18, wherein the signal containing memory device data is returned via a backscattering modulation.

20. The tape cartridge of claim 16, wherein the transmitting antenna is connected to a tape drive.

21. The tape cartridge of claim 16, wherein the transmitting antenna is connected to a hand held reader.

22. The tape cartridge of claim 16, wherein the flexible antenna is a helical antenna.

23. A method of transmitting data from a tape cartridge using radio frequency signals, comprising:
- imbedding a tape cartridge frame with an antenna;
- positioning a memory device in a corner of the tape cartridge, wherein the memory device is connected to the imbedded antenna;
- receiving a radio frequency signal sent from a transmitting antenna at the imbedded antenna, wherein the imbedded antenna is molded into the frame of the tape cartridge in such a manner that signals may be received by the flexible antenna through at least two surfaces of the tape cartridge;
- detecting a decrease in amplitude at the transmitting antenna indicating the presence of the memory device;
- transmitting tape cartridge data stored in the memory device to the transmitting antenna.

24. The method of claim 23, wherein the radio frequency signals from the transmitting antenna energize the imbedded antenna via inductive coupling.

25. The tape cartridge of claim 24, further comprising:
- wherein the energized imbedded antenna returns a radio frequency signal containing tape cartridge data stored within the memory device to the transmitting antenna.

26. The tape cartridge of claim 25, wherein the signal containing memory device data is returned via a backscattering modulation.

27. The tape cartridge of claim 23, wherein the transmitting antenna is connected to a tape drive.

28. The tape cartridge of claim 23, wherein the transmitting antenna is connected to a hand held reader.

29. The tape cartridge of claim 23, wherein the flexible antenna is a helical antenna.

* * * * *